C. E. VAWTER.
PNEUMATIC TIRE.
APPLICATION FILED NOV. 10, 1914.
1,189,511.
Patented July 4, 1916.
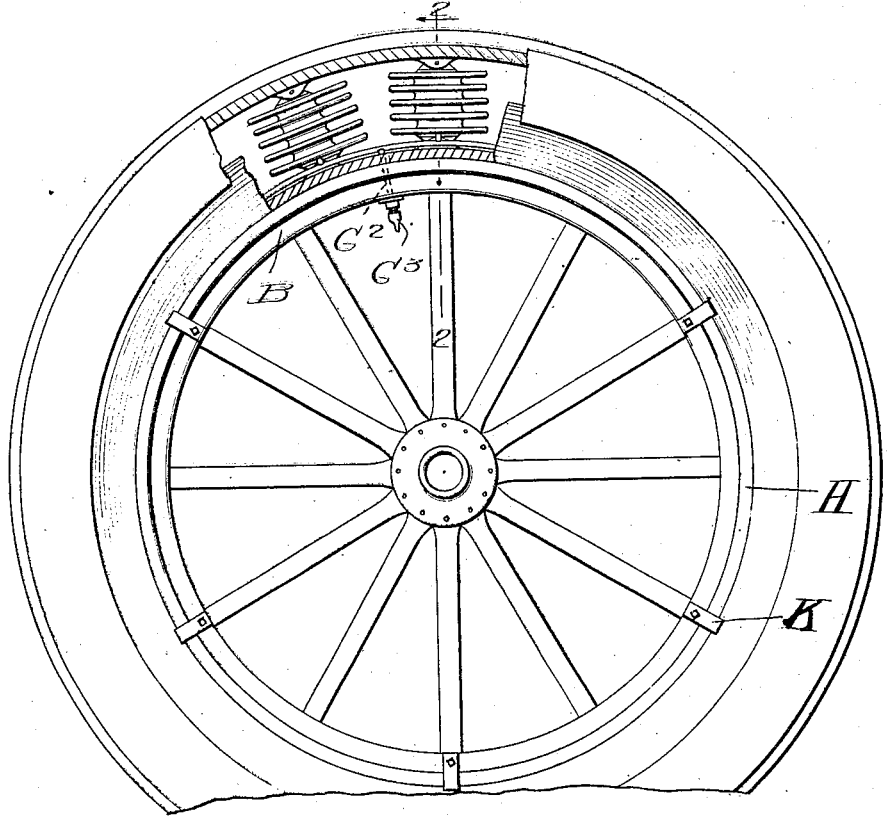
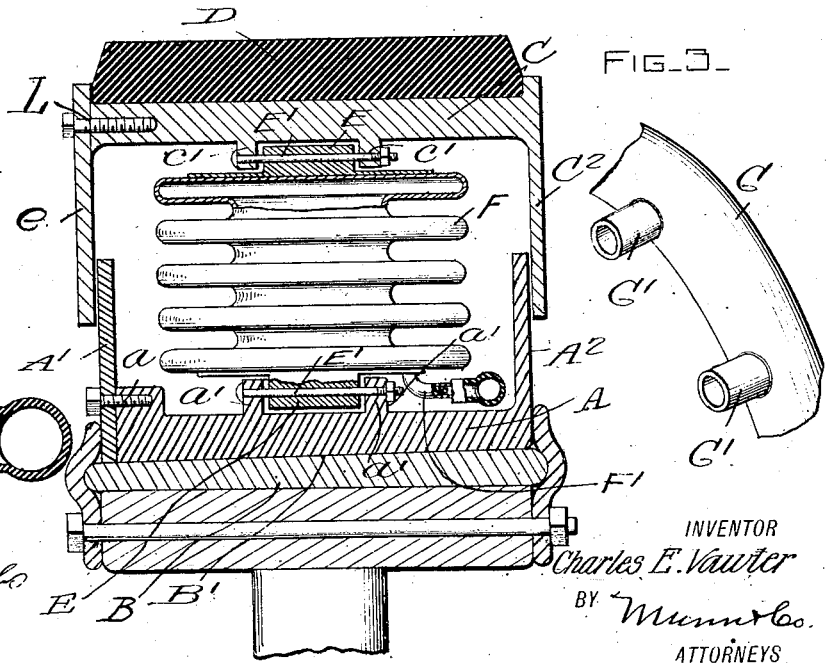
WITNESSES
INVENTOR
Charles E. Vawter
BY Munn & Co.
ATTORNEYS

UNITED STATES PATENT OFFICE.

CHARLES E. VAWTER, OF BLACKSBURG, VIRGINIA.

PNEUMATIC TIRE.

1,189,511. Specification of Letters Patent. Patented July 4, 1916.

Application filed November 10, 1914. Serial No. 871,360.

*To all whom it may concern:*

Be it known that I, CHARLES E. VAWTER, a citizen of the United States, and a resident of Blacksburg, in the county of Montgomery and State of Virginia, have invented an Improvement in Pneumatic Tires, of which the following is a specification.

My present invention relates generally to pneumatic tires for automobiles, bicycles, motorcycles, and other vehicles, and is more particularly an improvement in the construction thereof wherein a solid outer shoe is employed in connection with non-puncturable inner pneumatic supporting members, themselves disposed in protected position between the felly of a wheel and an outer rim supporting the said shoe. These improvements, together with their advantages, both as regards structure and operation, will clearly appear in the course of the following description, in which reference is made to the accompanying drawing, forming a part of this specification, and in which—

Figure 1 is a side elevation of a wheel provided with my improved pneumatic tire construction, partly broken away in order to better illustrate the protected pneumatic supporting members. Fig. 2 is a radial section taken therethrough substantially on line 2—2 of Fig. 1. Fig. 3 is a perspective detail of a fragmentary portion of the inflating ring. and Fig. 4 is a detail view partly broken away and in section illustrating the connection between the inflating ring and one of the pneumatic supporting members.

In the accompanying drawings A indicates a felly plate having its inner side beveled as at B', and disposed upon the beveled face of a wedge-shaped member B, which is mounted on the usual felly H of a wheel. A circular outstanding flange A' is detachably secured to one side of the felly plate by fastening members $a$, and a similar flange $A^2$ is formed integral with the opposite side of the felly plate. Clips K are detachably secured at one end to the felly and extend around the wedge member and engage the side of the plates A' and $A^2$ to fasten the felly plate upon the felly. These felly plate flanges A' and $A^2$ slidably engage the inner surface of inwardly extending circular flanges C' and $C^2$ of an outer rim plate C, flange C' of which is detachably connected to the rim plate by fastening members L, so that by detaching the flanges C' and A', ready access to the annular space between the felly plate A and the rim plate C may be had. The exterior or tread surface of the rim plate C is annularly grooved to provide for the reception of a solid tread shoe D which may be of suitable material, either rubber or a composition adapted to promote an effective tractive engagement. At equi-distantly spaced points around the wheel, the felly plate A and rim plate C are provided with opposing transversely spaced and apertured lugs $a'$ and $e$ between which are swivelly supported connecting blocks E, the swiveled connections of which are formed by transverse bolts E' extending through apertures in these blocks and through the apertured lugs $a'$ and $e$, just mentioned.

The several pneumatic supporting members are disposed radially between the felly plate A and the rim plate C at spaced points around the entire wheel with their inner and outer closed ends suitably secured to opposing connecting blocks E, these several supporting members being in the form of flexible corrugated metal cylinders F, each having an inner flexible rubber filling tube F' in which is disposed an inwardly opening check valve $f$. The several pneumatic supporting members thus formed may be simultaneously supplied with air by means of a tubular inflating ring G, which is extended around the felly plate A in the protected annular space between the same and the rim plate C, the tubular ring G being provided with a plurality of laterally projecting spaced tubes G' for connection with the filling tubes F' of the pneumatic supporting members F, in the manner particularly shown in Figs. 2 and 4. This hollow inflating ring G is also provided with a main valve tube $G^2$ which extends inwardly through the felly B and which may be provided with the ordinary form of inflating valve $G^3$ to receive the nozzle of a suitable pump. In this manner the several flexible metal cylinders F may be simultaneously supplied with the requisite amount of air pressure and, by their inwardly opening check valves $f$, are subsequently cut off from one another so that as to its supporting action, each of these cylinders acts entirely independent of the others.

The connections between the several supporting cylinders F and the rim and felly plates allow sufficient play for the torque of the wheel and the slidably engaging flanges of the rim and felly plates close the space between these plates and effectively protect the parts disposed in such space as well as prevent lateral movement of the rim plate with respect to the felly plate.

It will be further seen that tires so constructed may be readily disposed on and removed from the felly of a wheel, by removing the clips K and sliding the tire laterally on or off of the felly of the wheel, the relatively engaging surfaces of the felly plate A and the wedge member B, indicated at B' in Fig. 2, being preferably inclined to some degree for this purpose. Ready access to the parts within the channel may be obtained by removing flanges C' and A'.

I claim:—

1. A pneumatic tire, comprising a tread annulus and a felly annulus, a plurality of longitudinally collapsible air cylinders interposed between said annuli, means for pivotally connecting the terminals of the cylinders to the tread and felly annuli, and flexible means for delivering air to the cylinders.

2. In a pneumatic tire, the combination of a felly and rim plates having lapping slidably engaging side flanges certain of which are removable and forming an annular space therebetween, a plurality of spaced corrugated metal cylinders disposed radially in the said annular space, said cylinders having flexible connections with the felly and rim plates, valve controlled filling tubes connected to each of the cylinders, and means connected to said filling tubes for delivering air to the cylinders under pressure.

3. In a pneumatic tire of the character described, the combination of felly and rim plates forming an annular space therebetween, and a plurality of spaced corrugated metal cylinders disposed radially in the said annular space and having closed ends and valve controlled filling tubes, means connected to said filling tubes for simultaneously supplying air under pressure to said cylinders, and hinged connections between the inner and outer ends of said cylinders and the said felly and rim plates, all as and for the purpose set forth.

4. In a pneumatic tire, the combination of spaced felly and rim plates, a plurality of closed corrugated metal cylinders disposed radially between the felly and rim plates and hinged thereto, each of said cylinders having a filling tube provided with an inwardly opening check valve, and an inflating ring extending around the series of cylinders and having a filling valve, said inflating ring being connected to the filling tubes of the corrugated cylinders whereby the latter may be simultaneously supplied with air.

5. A pneumatic tire, comprising a tread annulus and a felly annulus, a plurality of longitudinally collapsible air carrying cylinders arranged radially between said annuli, and pivotally connected at their opposite ends to the respective annuli to move angularly with respect to either of said annuli circumferentially thereof, and flexible air carrying means connected to said cylinders for supplying air under pressure thereto and movable circumferentially of said annuli with said cylinders.

6. In a pneumatic tire, the combination with telescopic flanged felly and rim plates forming an annular space therebetween, of a plurality of longitudinally yieldable cylinders disposed radially in said space, flexibly attached to said rim and felly plates respectively at opposite ends and closed at said points of attachment, a tubular ring extending around and within said annular space, and a plurality of flexible valve-controlled ducts connecting said ring with the individual cylinders for supplying air to all of them simultaneously.

CHARLES E. VAWTER.

Witnesses:
W. B. PENICK,
C. L. PEDIGO.

Copies of this patent may be obtained for five cents each, by addressing the "Commissioner of Patents, Washington, D. C."